United States Patent

Kruklitis

[15] 3,699,430

[45] Oct. 17, 1972

[54] ELECTROMAGNETIC READ AND WRITE HEAD TEST DEVICE AND METHOD USING A MINUTE BODY OF MAGNETIC RECORDING MATERIAL

[72] Inventor: Karlis Kruklitis, Plymouth, Mich.

[73] Assignee: Burroughs Corporation, Detroit, Mich.

[22] Filed: Feb. 5, 1971

[21] Appl. No.: 112,929

[52] U.S. Cl. ............................324/34 R, 179/100.2 B

[51] Int. Cl. ..............................................G01r 35/00

[58] Field of Search..324/34 R, 34 TA; 179/100.2 A, 179/100.2 B, 100.2 R; 340/174.1 B

[56] References Cited

UNITED STATES PATENTS

| | | | |
|---|---|---|---|
| 2,528,682 | 11/1950 | Blaney | 324/34 TA |
| 2,774,056 | 12/1956 | Stafford et al. | 179/100.2 B |
| 2,870,430 | 1/1959 | Hancock | 179/100.2 B |
| 2,922,106 | 1/1960 | Oates et al. | 324/34 TA |
| 3,290,666 | 12/1966 | Crew | 340/174.1 B |
| 3,329,943 | 7/1967 | Tanguy, Jr. et al. | 340/174.1 B |
| 3,478,262 | 11/1969 | Vigil | 324/34 R |

OTHER PUBLICATIONS

Gagliano et al.; Magnetic Head Tester; I.B.M. Tech. Disl. Bull.; Vol. 6, No. 3, Aug. 1963 pp. 1– 3

*Primary Examiner*—Robert J. Corcoran
*Attorney*—Kenneth L. Miller and Edwin W. Uren

[57] ABSTRACT

A controlled magnetic field source is provided, the source being formed of a small body of accurately shaped, magnetic recording tape precisely disposed and magnetically isolated on the periphery of a rotatable drum. A particularly singular embodiment of this invention also provides read and write head holders to contain respective read and write heads, the holders being adjustable to accurately position a preselected head track effectively adjacent the circumferential path described by the magnetic recording tape as the drum is rotated.

17 Claims, 8 Drawing Figures

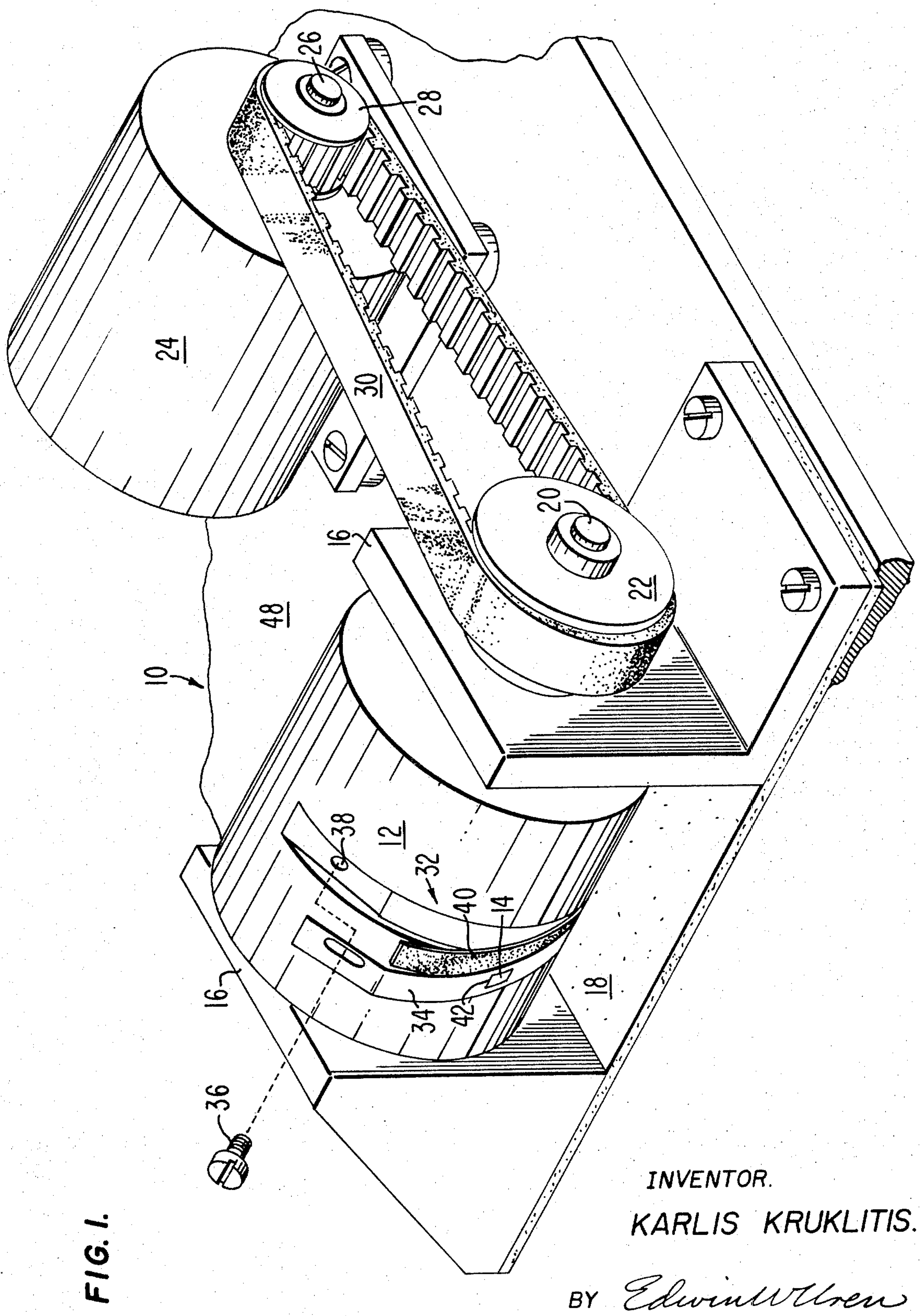
FIG. I.
INVENTOR.
KARLIS KRUKLITIS.
BY Edwin W. Uren
AGENT.

ELECTROMAGNETIC READ AND WRITE HEAD TEST DEVICE AND METHOD USING A MINUTE BODY OF MAGNETIC RECORDING MATERIAL

BACKGROUND OF THE INVENTION

The invention relates to magnetic field sources and more particularly to electromagnetic read and write head test devices.

Prior art discloses devices using electrical conductors for providing magnetic field sources. A typical example is a wire coiled around a core to form a winding, a magnetic field being created when an electrical current is passed through the winding. The effectiveness of these types of devices is reduced by problems of alignment and losses due to spacing control difficulties. Magnetic, recording-type heads are also commonly used as sources for magnetic fields. They are plagued by problems similar to those associated with the coil devices, especially those relating to spacing control. Also used as sources of magnetic fields are web materials, such as paper, coated or printed with magnetic encoding ink. Wear and the relatively rapid diminishing of signal-to-noise ratio are problems particularly associated with using these devices.

SUMMARY OF THE INVENTION

The invention resides in the provision of a controlled magnetic field source for use in calibrating or testing a great variety of magnetic and electromagnetic devices, a prime example being electromagnetic read and write heads, by means of a small body of magnetic recording tape peripherally mounted on a drum which is rotatable to revolve the strip of tape effectively past the device to be calibrated or tested.

Accordingly, it is an object of the present invention to provide a controlled magnetic field source which is capable of being precisely aligned and spaced with respect to the associated device being calibrated or tested.

It is another object of the invention to provide a device capable of producing an accurately controlled magnetic field.

It is yet another object of the invention to provide a device having a relatively long service life.

It is another object of the invention to provide a device not subject to wear by friction.

Still another object of the invention is to provide a device capable of maintaining a desired signal-to-noise ratio for a relatively long period.

An important aspect of the invention is the use of a strip of magnetic recording tape as a magnetic field source. The strip of tape can be accurately formed and mounted to provide a precisely controlled magnetic field after being suitably polarized by any desired magnetic means.

Another important aspect of the invention is the use of a drum for mounting the strip of magnetic recording tape to provide for a precise rate of change of the magnetic field thereof with respect to a device being tested.

An important aspect of the embodiment of the invention herein described is the use of an electrically conductive and magnetically insulating mounting strip to accurately secure the strip of magnetic recording tape to the drum.

Another important aspect of this particular embodiment is the electrical insulation of the mounting strip with respect to the mounting structure and the associated use of an electrical continuity indicator connected between these two parts to thereby provide a means for precisely determining a base point for adjusting the gap between a head to be tested and the circumferential path described by the strip of magnetic recording tape as it is revolved by the drum.

Yet another important aspect of this particular embodiment is the use of micrometer-type adjustments to accurately adjust the vertical and lateral position of a head to be tested with respect to the drum.

BRIEF DESCRIPTION OF THE DRAWINGS

These and other objects, aspects and advantages of the invention will be more clearly understood from the following description when read in conjunction with the accompanying drawings, in which:

FIG. 1 is a perspective view of a controlled magnetic field source embodying features of the invention;

DETAILED DESCRIPTION OF THE INVENTION

Figure 4:
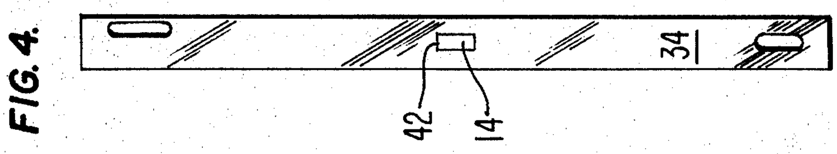
FIG. 4 is a plan view of another element of the invention, shown removed from the device.
Figure 3:
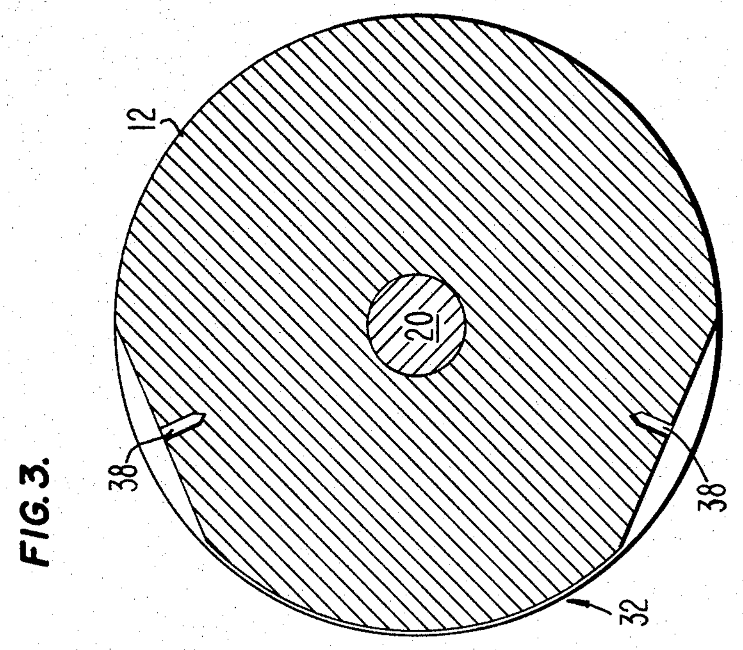
FIG. 3 is a sectional view of the device of FIG. 2 and is taken along line 3—3 of that figure.
Figure 2:
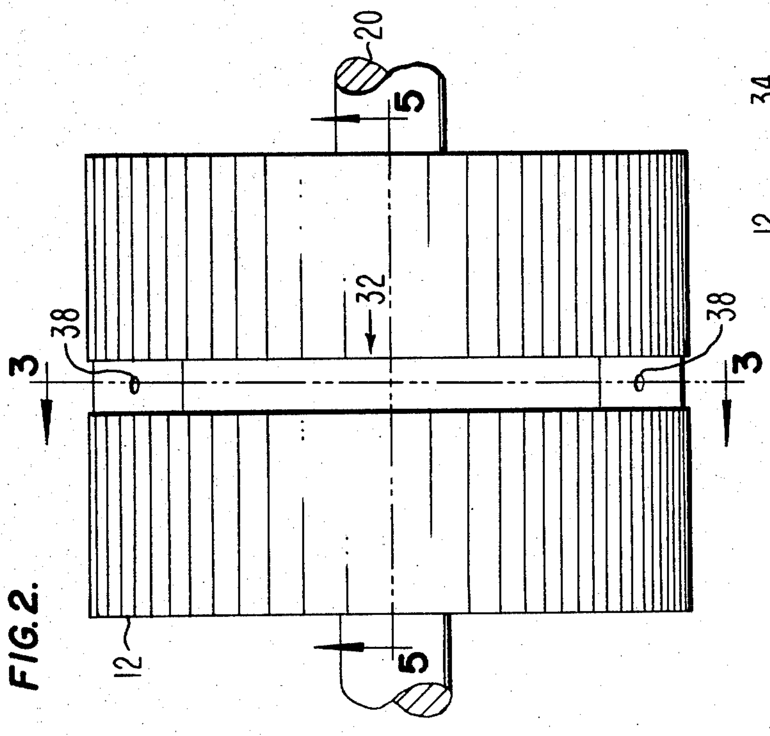
FIG. 2 is a side view of an element of the invention, shown removed from the device.

The controlled magnetic field source shown in FIGS. 1 through 5 has a support structure or frame generally indicated at 10, a drum 12 and a small body of magnetic recording tape 14. The drum is rotatably mounted on the frame, and the tape is secured to the periphery of the drum.

Secured to the frame are a pair of upright, drum support plates 16—16 which are parallel and diametrically spaced apart. Disposed between the plates and the frame is a block of material 18, such as ceramic, to electrically insulate the plates from the frame. Rotatably supported by the plates is a drum shaft 20 to which the drum 12 is affixed. One end of the drum shaft extends through its associated drum support plate, and a drum pulley 22 is mounted thereon. A constant-speed motor 24, which may be any one of a number of well-known types, is mounted on the frame 10 such that the drive shaft 26 of the motor is parallel to but spaced apart from the drum shaft 20. A motor pulley 28 is affixed to the drive shaft and is disposed effectively adjacent the drum pulley 22, and an endless belt 30 operatively couples one pulley to the other.

Figure 5:
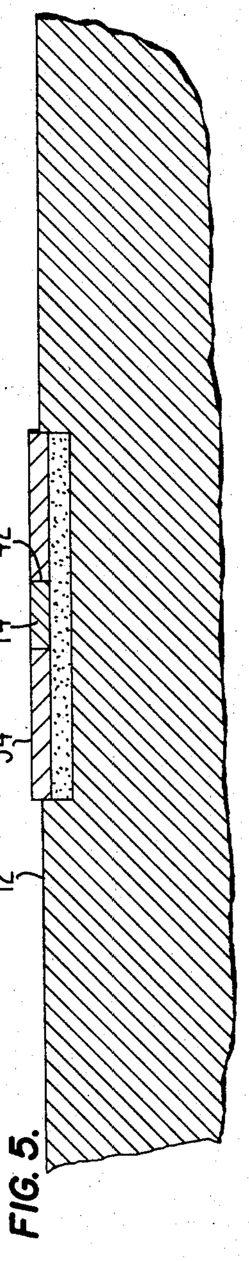
FIG. 5 is a partial sectional view of the device of FIG. 2 showing the disposition of the element of FIG. 4 thereon and is taken along line 5—5 of that figure.

The drum 12 is circumferentially slotted as generally indicated at 32, forming a recess to receive a mounting strip 34. The mounting strip is secured to the drum within the recess by a pair of screws 36—36 each passing through an aperture near each end of the strip and threading into holes 38 radially disposed in two flat areas formed by relieved portions of the recess, the screws normally residing below the surface of the drum. As can readily be observed in FIG. 4, the apertures near the ends of the mounting strip are not symmetrically disposed. The aperture near one end is somewhat laterally offset so that the strip can be affixed to the drum in only one way. In addition to the screws, a tape 40 having adhesive on both of its sides is sandwiched between the mounting strip 34 and the bottom of the recess in the drum 12 to ensure uniform contact between the two. When properly secured in the recess of the drum, the outward-facing surface of the mounting strip will be positioned slightly above the circumferential surface of the drum, as shown in detail in FIG. 5. The mounting strip is formed of an electrically conductive and magnetically insulating material and has an aperture 42 substantially centrally located to receive the small body of magnetic recording tape 14. This aperture 42 is shown in FIGS. 1, 4 and 5 greatly enlarged for illustrative purposes, its actual dimensions normally being much smaller. Its width, for example, may commonly be only slightly greater than that of the pole pieces of a read head to be tested; and its length may be merely sufficient to record a few complete alternations of a desired test signal.

DESCRIPTION OF A PREFERRED EMBODIMENT

Although the controlled magnetic field source lends itself to a great many useful applications, such as the testing and calibrating of magnetic and electromagnetic devices, only one typical illustration will be considered in detail for the sake of brevity. The application to be described herein is that of an electromagnetic read and write head test device. It is shown in appreciable detail in FIGS. 6, 7 and 8, the device illustrated by the first five figures being included therein.

Figure 6:
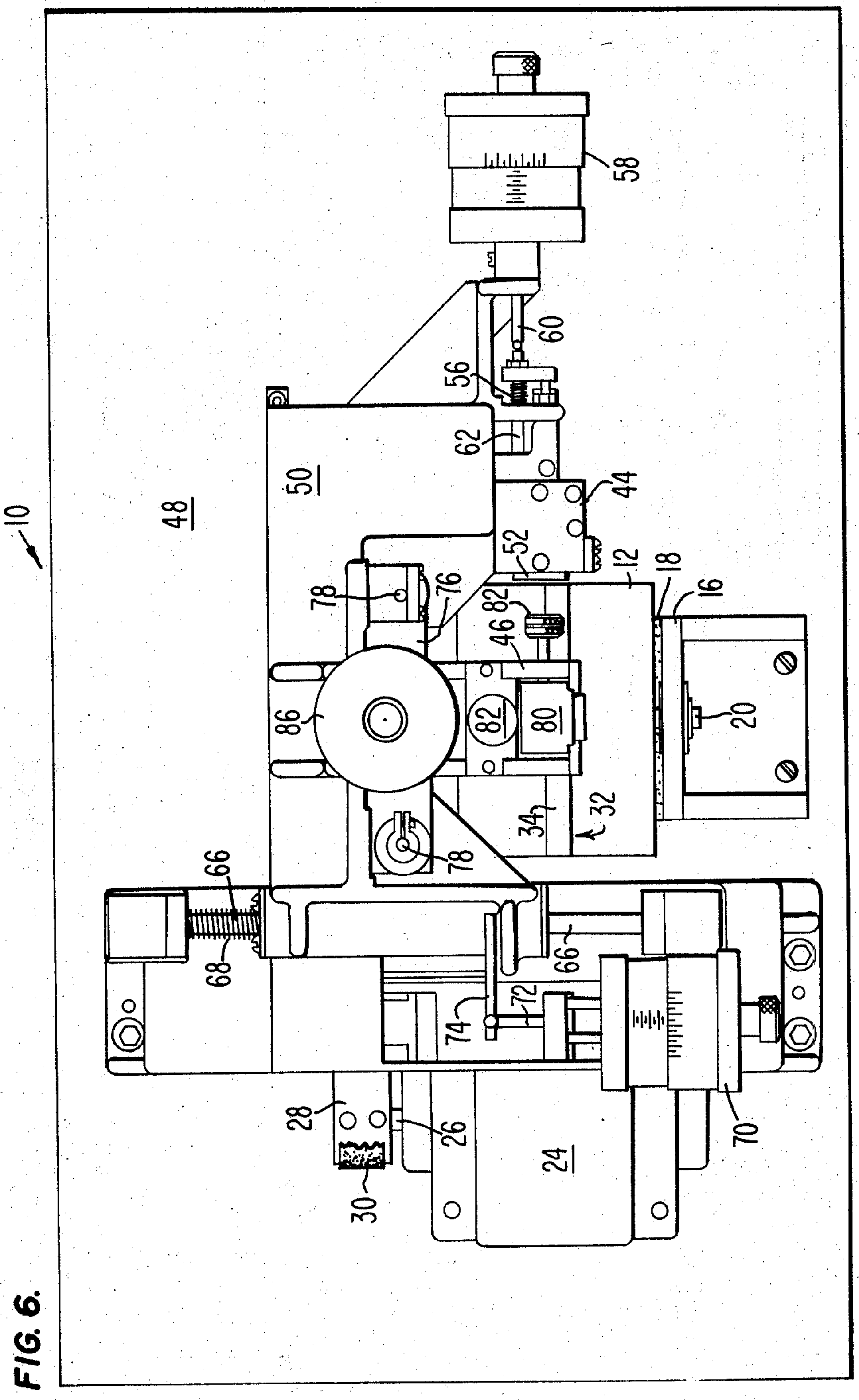
FIG. 6 is a plan view of an embodiment of the invention shown in FIG. 1.
Figure 7:
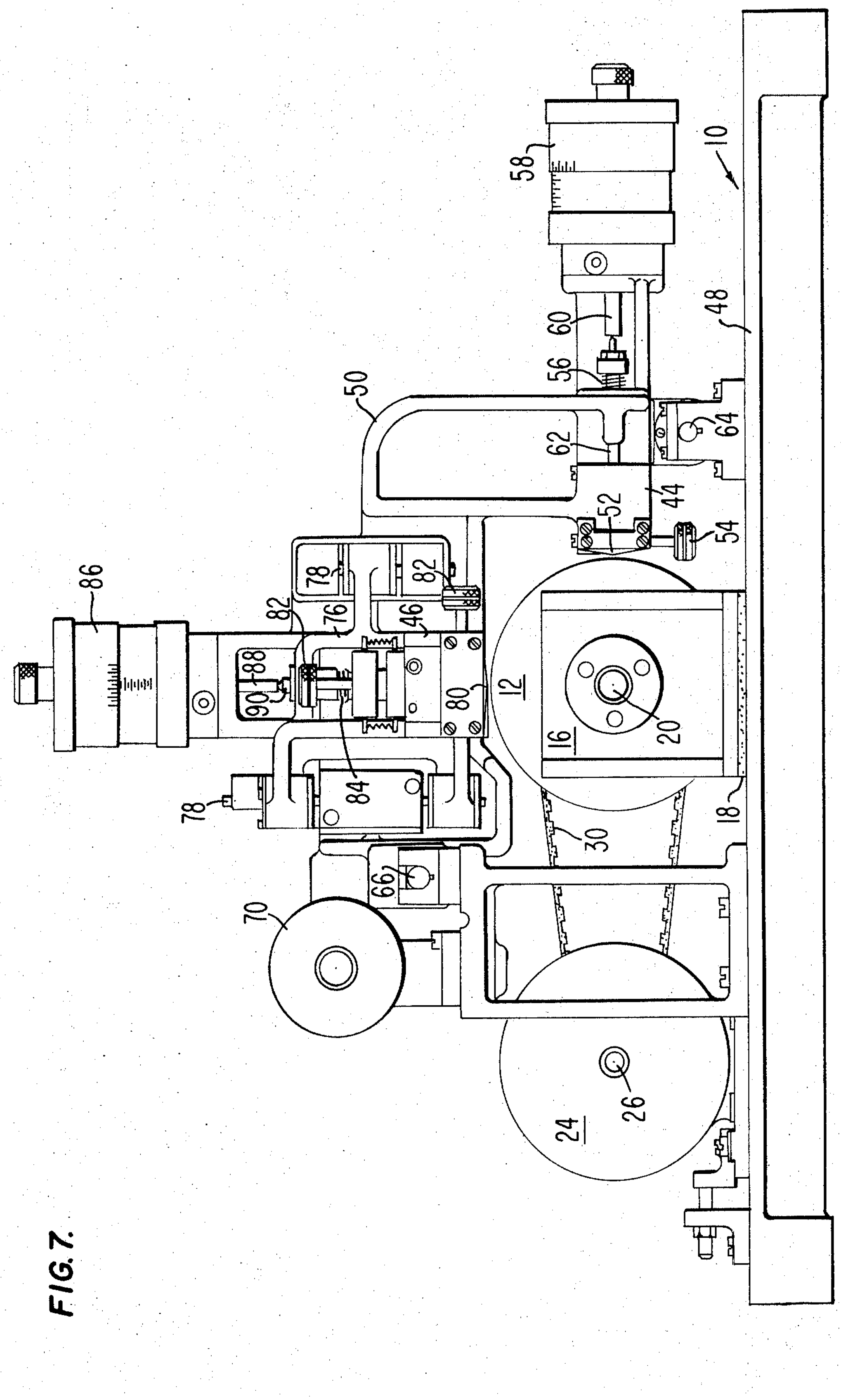
FIG. 7 is a front view of the device of FIG. 6.
Figure 8:
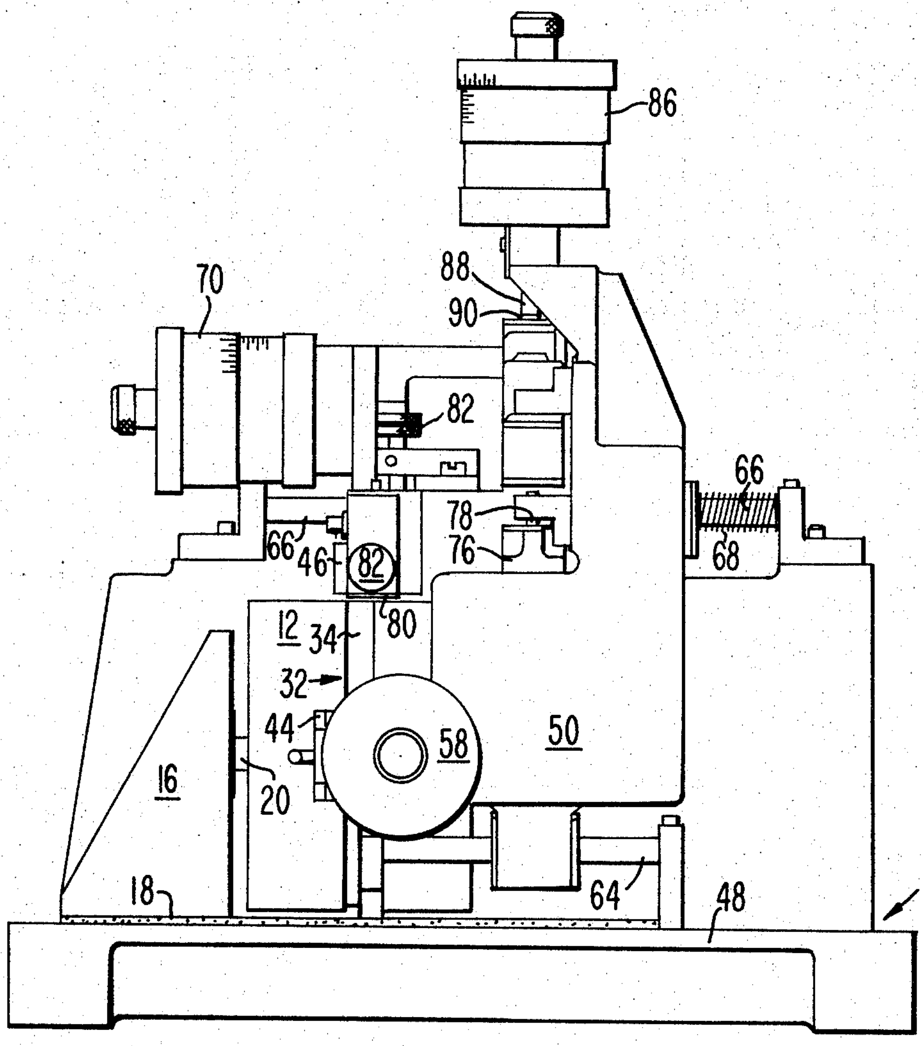
FIG. 8 is an end view of the device of FIG. 6.

The electromagnetic read and write head test device shown in FIGS. 6, 7 and 8 has a support structure or frame generally indicated at 10, a drum 12, a write head holder 44, a read head holder 46 and a small body of magnetic recording tape 14. The drum is rotatably mounted on the frame, the tape is secured to the periphery of the drum, and the write and read heads are mounted on the frame, effectively adjacent the circumferential path described by the body of tape as the drum is rotated.

A pair of upright, drum support plates 16 are mounted parallel and diametrically spaced apart on a base plate 48 of the frame 10, an electrically insulating block 18 being effectively disposed therebetween. A drum shaft 20 is rotatably supported by the plates 16, the drum 12 being mounted thereon. A constant-speed motor 24, which may be any one of a number of well-known types, is mounted on the base plate 48 such that the drive shaft 26 of the motor is parallel to but spaced apart from the drum shaft 20. A motor pulley 28 is affixed to the motor drive shaft and is disposed effectively adjacent a drum pulley 22 mounted on an end of the drum shaft 20 that extends through its associated drum support plate 16. An endless belt 30 operatively couples the motor pulley to the drum pulley.

The drum 12 is as described in the "Detailed Description of the Invention," having a circumferential recess 32 to receive a mounting strip 34. The mounting strip is secured to the drum in the manner previously described and is also formed of an electrically conductive and magnetically insulating material. It likewise has a substantially centrally located aperture 42 to receive the small body of magnetic recording tape 14, the dimensions of which are of similar magnitude to those of the tape previously described.

Laterally adjacent the periphery of the drum 12 is disposed the write head holder 44, it being adjustably mounted on a transverse carriage 50. The holder is capable of retaining a write head 52 therein and effectively positioning it with respect to the drum. The write head is positioned within the holder relative to three reference planes (not shown) and is retained thereagainst by a clamp controlled by a clamp-release screw 54. The write head holder 44 is resiliently biased away from the drum by a helical spring 56 and is precisely advanced theretoward by a micrometer-type, write head adjustment 58. When rotated, the adjustment extends and retracts an adjustment plunger 60 which is operatively coupled to the write head holder 44 by a shaft 62, thereby moving the holder respectively toward or away from the drum.

The transverse carriage 50 is slidably mounted on the base plate 48. It is an L-shaped structure which rests on a lower transverse carrier support shaft 64 and an upper transverse carrier support shaft 66 such that one of its extensions is disposed perpendicular to the base plate 48 and the other horizontally overlies the drum 12. The upper and lower carrier support shafts are disposed parallel to the drum shaft 20. The transverse carriage 50 is fitted with bearings to receive the shafts such that it can be slidably guided thereby in a direction parallel thereto. The carriage 50 is resiliently biased toward the front of the device, i.e., downward as shown in FIG. 6, by a helical spring 68 and is precisely advanced toward the rear of the device by a micrometer-type, transverse carriage adjustment 70. When rotated, the adjustment extends and retracts an adjustment plunger 72 which is operatively coupled to the transverse carriage by an arm 74 extending therefrom, moving the carriage respectively rearward and forward thereby. Since the write head holder 44 is mounted on the carriage, it will move with it, carrying the write head held therein respectively toward the rear and front of the drum 12.

Also mounted on the transverse carriage 50 is a read head carriage 76 which is likewise slidably guided in a vertical direction by a pair of upright, read head carriage support shafts 78—78 rigidly secured to the transverse carriage. The read head holder 46 is mounted on the read head carriage 76 and is disposed to centrally overlie the drum 12. The holder is capable of retaining a read head 80 therein and effectively positioning it with respect to the drum. The read head is positioned within the holder relative to three reference planes (not shown) and is retained thereagainst by clamps controlled by clamp-release screws 82—82. The read head carriage 76 is resiliently biased away from the drum 12 by a helical spring 84 and is precisely advanced theretoward by a micrometer-type, read head adjustment 86. When rotated, the adjustment extends and retracts an adjustment plunger 88 which abuts a stud 90 mounted on the read head carriage, thereby moving the carriage respectively downward and upward. Being affixed to the carriage, the read head holder 46 will move with it, carrying the read head clamped therein respectively toward and away from the drum 12.

The test device also includes an electrical continuity indicator (not shown) electrically connectable to heads secured by the write and read head holders, 44 and 46 respectively, and to the mounting strip 34 by way of the drum 12. This includes an electrical power supply and a lamp connected in series with the heads and the mounting strip such that when physical contact is made between the latter two, the lamp will provide a visual indication of that contact. Any similar continuity-indicating device could also be employed, for example, a buzzer, bell or meter.

In order to provide initial magnetic polarization of the body of magnetic recording tape 14, a signal generator (not shown) is also included and is connectable to a write head secured in the write head holder 44. The signal generator used may be one of any standard, relatively accurate, types; and the frequency chosen would be a function of the speed of rotation of the drum 12, the size of the body of magnetic recording tape 14 secured thereto and the number of complete test signal alternations to be recorded on the tape.

As a means to check the output and track crosstalk of heads being tested, a monitor is also included in the test device and is connectable to a read head secured in the read head holder 46. The monitor may be any standard type, having visual output indicators or automatic comparison circuits which compare the signal output from a read head being tested to a reference and indicate whether or not the output is within a predetermined, allowable variance range.

OPERATION

Since the preferred embodiment previously described is a typical application of the invention, its operation will herein be described. It will be assumed for the sake of illustration that an electromagnetic read head is the device to be tested.

A mounting strip 34 having a body of magnetic recording tape 14 of desired dimensions secured centrally therein is first mounted on the drum 12 as shown in FIGS. 1 and 5. The strip is placed in the circumferential recess, generally indicated at 32, of the drum and is secured therein by a pair of screws 36—36. A tape 40 having adhesive on both of its sides is sandwiched between the mounting strip and the bottom of the recess in the drum to ensure uniform contact between the two. As shown in detail in FIG. 5, the outward-facing surface of the mounting strip 34 will be positioned slightly above the circumferential surface of the drum 12 when the strip is properly secured in the recess.

Once the mounting strip 34 has been properly secured to the drum 12, an electromagnetic read head 80 is inserted in the read head holder 46, as shown in FIGS. 6, 7 and 8; and clamped in position by tightening the two clamp-release screws 82—82. The micrometer-type, transverse carriage adjustment 70 is then rotated, thereby moving the transverse carriage 50 to which the read head holder 46 is attached, until the read head is centrally positioned over the mounting strip 34 on the drum 12. The drum is then manually rotated until the body of magnetic recording tape 14 is positioned under the read head. The micrometer-type, read head adjustment 86 is then rotated, thereby moving the read head carriage 76 to which the read head is also attached, until the read head just contacts the mounting strip 34, as indicated by the electrical continuity indicator. Once this point is established, the head can be retracted slightly and then moved transversely to check its mechanical flatness. It can then be positioned with any desired track overlying the body of magnetic recording tape 14 and having any desired head-to-tape gap.

An electromagnetic write head 52 is also installed in a manner similar to that described for the read head installation. It is clamped in the write head holder 44 by tightening the clamp-release screw 54. The head is moved across the drum by rotating the transverse carriage adjustment 70 and is radially positioned by rotating the write head adjustment 58.

Once the heads have been properly installed in their respective holders, the drum is rotated at a precise rate. The signal generator is energized and connected to the write head 52, magnetically polarizing the body of magnetic recording tape 14 with a predetermined number of signal alternations. The signal generator is then disconnected from the write head. As the body of magnetic recording tape passes beneath the read head 80, the magnetic field associated with the magnetic polarization retained by the tape will induce an electrical current in the winding of the read head, producing an output signal therefrom. The read head track outputs and crosstalk may now be monitored and a determination made of the quality of the read head being tested. Each track of the head can be checked by rotating the read head adjustment 86 to bring them effectively adjacent the path described by the body of magnetic recording tape as the drum is rotated.

A write head may also be tested by using a read head having known output characteristics to produce output signals in response to magnetic polarizations induced in the body of magnetic recording tape by the write head being tested.

What is claimed is:

1. In an electromagnetic read and write head test device having a read and write head and means to record a signal for testing, the improvement wherein said means to record comprises a support structure, a cyclically movable member mounted on said support structure, and a minute, discrete body of magnetic recording material mounted on said cyclically movable member and occupying only a minute portion of the periphery of the cylindrical member.

2. In an electromagnetic read and write head test device as defined by claim 1 wherein said cyclically movable member is a rotatable drum having at least a circumferential portion thereof formed of a magnetically insulating material, said minute, discrete body of magnetic recording material being peripherally mounted within the boundary thereof.

3. In an electromagnetic read and write head test device as defined by claim 2 wherein said minute, discrete body of magnetic recording material is formed of magnetic recording tape and has a width approximating that of one pole-piece of an associated electromagnetic read or write head to be tested and has a length capable of recording a few complete alternations of a desired test signal.

4. In an electromagnetic read and write head test device as defined by claim 3 and additionally comprising a mounting strip peripherally securable to said drum and having an aperture to receive said magnetic recording tape.

5. In an electromagnetic read and write head test device as defined by claim 4 wherein said mounting strip is constructed of an electrically conductive and magnetically insulating material.

6. In an electromagnetic read and write head test device as defined by claim 5 wherein the angular velocity of said drum is maintained at a constant rate.

7. An electromagnetic read and write head test device comprising:

a support structure;

a drum mounted on said support structure and being rotatable at a constant angular velocity;

a write head holder mounted on said support structure for maintaining a write head secured therein effectively adjacent said drum;

a read head holder mounted on said support structure for maintaining a read head secured therein effectively adjacent said drum and circumferentially spaced apart from said write head holder; and a minute, discrete body of magnetic recording material peripherally mounted on said drum and occupying only a minute portion of the periphery of the drum to revolve effectively past a write head secured in said write head holder for becoming magnetically polarized thereby and subsequently past a read head secured in said read head holder for electromagnetically producing an electrical output therefrom.

8. An electromagnetic read and write head test device as defined by claim 7 wherein said body of magnetic recording material is formed of magnetic recording tape and has a width approximating that of one pole-piece of an associated electromagnetic read or write head to be tested and has a length capable of recording a few complete alternations of a desired test signal.

9. An electromagnetic read and write head test device as defined by claim 8 and additionally comprising a mounting strip peripherally securable to said drum and having an aperture to receive said body of magnetic recording tape, the outward-facing surfaces of said tape and said mounting strip being coplanar.

10. An electromagnetic read and write head test device as defined by claim 9 wherein said mounting strip is constructed of an electrically conductive and magnetically insulating material.

11. An electromagnetic read and write head test device as defined by claim 10 wherein the outward-facing surface of said mounting strip normally resides slightly above that of said drum.

12. An electromagnetic read and write head test device as defined by claim 11 wherein said mounting strip is electrically insulated from said support structure.

13. An electromagnetic read and write head test device as defined by claim 7 wherein said write head holder and said read head holder are radially and laterally adjustable with respect to said drum to effectively juxtapose a preselected track of heads secured therein and the circumferential path described by said body of magnetic recording material as said drum is rotated.

14. An electromagnetic read and write head test device as defined by claim 7 and additionally comprising a signal generator electrically coupled to a write head secured in said write head holder for effecting magnetic polarization of said body of magnetic recording material.

15. An electromagnetic read and write head test device as defined by claim 14 and additionally comprising a monitor electrically coupled to a read head secured in said read head holder for checking read head track output and crosstalk.

16. A method of testing an electromagnetic read head comprising the steps of:

forming a minute and discrete body of magnetic recording material having a width approximating that of one pole-piece of an associated electromagnetic read head to be tested and having a length capable of recording merely a few complete alternations of a desired test signal;

mounting said body of magnetic recording material upon the peripheral surface of a rotatable drum such that the length of said body extends in a direction circumferential of said drum;

inducing a predetermined magnetic polarization pattern representative of a standard electrical signal upon said body of magnetic recording material;

positioning said drum such that said body of magnetic recording material is effectively adjacent the desired pole-piece of the read head;

rotating said drum at a constant angular velocity;

monitoring the electrical signal generated in the output winding of the read head; and comparing the signal generated in the output winding of the read head by the magnetic polarization pattern of the passing body of magnetic recording material to the standard signal which induced the magnetic polarization pattern of said body, thereby enabling a determination of read head characteristics.

17. A method of testing an electromagnetic write head comprising the steps of:

forming a minute and discrete body of magnetic recording material having a width approximating that of one pole-piece of an associated electromagnetic write head to be tested and having a length capable of recording merely a few complete alternations of a desired test signal;

mounting said body of magnetic recording material upon the peripheral surface of a rotatable drum such that the length of said body extends in a direction circumferential of said drum;

positioning the write-head such that the desired pole-piece thereof is effectively adjacent said body of magnetic recording material mounted upon said drum;

rotating said drum at a constant angular velocity;

inducing a predetermined magnetic polarization pattern representative of a standard electrical signal upon said body of magnetic recording material;

positioning a read head having known output characteristics such that the desired pole-piece thereof is effectively adjacent the path defined by the revolving body of magnetic recording material mounted upon said drum;

monitoring the electrical signal generated in the output winding of the read head; and comparing the signal generated in the output winding of the read head by the magnetic polarization pattern of the passing body of magnetic recording material to the standard signal which induced the magnetic polarization pattern of said body, thereby enabling a determination of write head characteristics.

* * * * *